(12) United States Patent
Ji

(10) Patent No.: US 12,465,801 B2
(45) Date of Patent: Nov. 11, 2025

(54) FITNESS TOOL STORAGE CASE

(71) Applicant: Mili YouHe Home Technology (Shanghai) Co, Ltd, Shanghai (CN)

(72) Inventor: Xiaoming Ji, Shanghai (CN)

(73) Assignee: Mili YouHe Home Technology (Shanghai) Co, Ltd, Shanghai (CN)

( * ) Notice: Subject to any disclaimer, the term of this patent is extended or adjusted under 35 U.S.C. 154(b) by 0 days.

(21) Appl. No.: 19/031,410

(22) Filed: Jan. 18, 2025

(65) Prior Publication Data
US 2025/0161737 A1 May 22, 2025

(30) Foreign Application Priority Data
Dec. 17, 2024 (CN) .......................... 202411866185.4

(51) Int. Cl.
 *A45C 13/00* (2006.01)
 *A45C 13/02* (2006.01)
 *A63B 21/055* (2006.01)

(52) U.S. Cl.
 CPC ........ *A63B 21/0557* (2013.01); *A45C 13/001* (2013.01); *A45C 13/002* (2013.01); *A45C 13/005* (2013.01); *A45C 13/02* (2013.01); *A45C 2013/025* (2013.01)

(58) Field of Classification Search
 CPC ... A45C 13/001; A45C 13/002; A45C 13/005; A45C 13/02; A45C 2013/025; A63B 21/0557; A63B 71/0036
 USPC .............................................. 206/579, 315.1
 See application file for complete search history.

(56) References Cited

U.S. PATENT DOCUMENTS

| | | | | |
|---|---|---|---|---|
| 2,983,367 | A * | 5/1961 | Parmater | A45C 5/03 312/351 |
| 7,458,920 | B2 * | 12/2008 | Hallar | A63B 21/072 482/910 |
| 7,946,970 | B2 * | 5/2011 | Garza, Jr. | A63B 71/0036 482/40 |
| 8,550,243 | B2 * | 10/2013 | Moore | A45C 5/00 224/650 |
| 8,814,759 | B2 * | 8/2014 | Goldy | A63B 71/0036 482/90 |
| 8,997,994 | B1 * | 4/2015 | Jung | A47B 81/00 206/541 |
| 9,867,440 | B2 * | 1/2018 | Lawrenson | A45C 13/02 |
| 10,953,260 | B2 * | 3/2021 | Weisz | A63B 21/0442 |
| 10,960,256 | B2 * | 3/2021 | Donnelly | A63B 21/4029 |
| 2003/0015445 | A1 * | 1/2003 | Levy | B25H 3/023 206/373 |

(Continued)

*Primary Examiner* — Steven A. Reynolds
(74) *Attorney, Agent, or Firm* — Hemisphere Law, PLLC; Zhigang Ma

(57) ABSTRACT

Provided is a fitness tool storage case. The fitness tool storage case includes: a first case body, and a second case body movably connected to the first case body. The first case body and the second case body can be in a storage state of being enclosed into a storage chamber and an open state of being stacked; in the storage state, at least one of a plurality of fitness tools is arranged in the storage chamber; and in the open state, at least one of the plurality of fitness tools can be exposed for being fetched by a user. According to the fitness tool storage case provided in the embodiments of the present disclosure, the plurality of fitness tool can be stored/placed. When the fitness tools are not used, an occupied space is reduced, and a user experience is enhanced.

8 Claims, 22 Drawing Sheets

(56) References Cited

U.S. PATENT DOCUMENTS

| | | |
|---|---|---|
| 2006/0170395 A1 | 8/2006 | Yoshimizu et al. |
| 2008/0023355 A1* | 1/2008 | Reynolds ........... A63B 71/0036 206/315.1 |
| 2008/0035509 A1 | 2/2008 | Redzisz |
| 2010/0101973 A1* | 4/2010 | Kim ....................... A63B 23/08 482/121 |
| 2012/0326669 A1 | 12/2012 | Horiyama et al. |

* cited by examiner

FITNESS TOOL STORAGE CASE

TECHNICAL FIELD

The present disclosure relates to the technical field of fitness tools, and in particular, to a fitness tool storage case.

BACKGROUND

With the improvement of the living standard and the enhancement of health awareness, many people will engage in fitness exercises, such as sit ups and dumbbell lifting, which can not only enhance abdominal strength, but also exercise the cardiovascular function, to achieve an effect of strengthening the body.

There are many types of existing fitness tools, which usually require a large occupation area and cannot be stored. When the fitness tools are idle, a great waste of the space may be caused. In a fitness scenario of usage at home, in offices, and the like, the idle tools placed around may also affect normal work and life.

SUMMARY

In view of this, it is necessary to provide a fitness tool storage case convenient for storage.

The embodiments of the present disclosure provide a fitness tool storage case, configured to store/place a plurality of fitness tools and including: a first case body, and a second case body movably connected to the first case body. The first case body and the second case body can be in a storage state of being enclosed into a storage chamber and an open state of being stacked; and in the storage state, at least one of the plurality of fitness tools is arranged in the storage chamber; and in the open state, at least one of the plurality of fitness tools can be exposed for being fetched by a user.

In an embodiment, the first case body and the second case body are rotationally connected to each other; and the second case body can be switched from the storage state of being spliced and enclosed with the first case body to form the storage chamber to the open state of being stacked on one side of the first case body.

In an embodiment, the first case body includes a bottom plate, a first side plate connected to the bottom plate, a second side plate connected to the bottom plate and opposite to the first side plate, a first connecting plate connected to the bottom plate, the first side plate, and the second side plate, and a first top plate connected to the first side plate, the second side plate, and the first connecting plate and opposite to the bottom plate; and the first case body has a first storage space.

The second case body includes a second top plate, a third side plate connected to the second top plate, a fourth side plate connected to the second top plate and opposite to the third side plate, and a second connecting plate connected to the second top plate, the third side plate, and the fourth side plate; the second top plate and the first top plate are rotationally connected to each other; the second case body has a second storage space; in the storage state, the second top plate and the first top plate are spliced with each other to form a top plate opposite to the bottom plate; the first side plate and the third side plate are spliced with each other to form a first side plate structure; the second side plate and the fourth side plate are spliced with each other to form a second side plate structure; the first side plate structure and the second side plate structure are opposite to each other; the first connecting plate and the second connecting plate are opposite to each other; and the second connecting plate is connected to the bottom plate.

In an embodiment, a size of the first top plate is consistent with a size of the second top plate; and in the open state, the second top plate is turned over to a position above the first top plate for being stacked and aligned with the first top plate.

In an embodiment, in the storage state, a width of the first side plate gradually decreases in a direction from the bottom plate to the first top plate, a width of the third side plate gradually increases in a direction from the bottom plate to the second top plate, and a width of the first side plate structure remains unchanged in a direction from the bottom plate to the top plate; and in the storage state, a width of the second side plate gradually decreases in the direction from the bottom plate to the first top plate, a width of the fourth side plate gradually increases in the direction from the bottom plate to the second top plate, and a width of the second side plate structure remains unchanged in the direction from the bottom plate to the top plate.

In an embodiment, the plurality of fitness tools further include a sit-up device; the sit-up device is configured to be arranged in the first storage space; the sit-up device include a supporting rod and a crossbeam; the supporting rod is movably connected to the bottom plate; the crossbeam is connected to one end of the supporting rod away from the bottom plate; the supporting rod is rotationally connected to the bottom plate, so that the sit-up device can be switched between a stacked state and a using state; a height of the sit-up device in the stacked state is less than a height of the sit-up device in the using state.

In an embodiment, the fitness tool storage case is further provided with at least one resistance band fixing apparatus; the at least one resistance band fixing apparatus is configured to fix a resistance band; the resistance band fixing apparatus includes a fixing ring for fixing the resistance band, and a protective cap covering the fixing ring; the fitness tool storage case is provided with a mounting position; the fixing ring is arranged at the mounting position; the protective cap is detachably connected to the mounting position; the protective cap is a flexible protective cap; a material of the protective cap includes silica gel; and the mounting position is located in an edge region of the bottom plate away from the first connecting plate.

In an embodiment, the bottom plate is provided with a mounting port; the fitness tool storage case further includes a sucker and a sucker operating member connected to the sucker; the sucker is mounted corresponding to the mounting opening and is located on an outer side of the bottom plate; the sucker operating member is mounted corresponding to the mounting opening and is located on an inner side of the bottom plate; the sucker operating member is connected to the sucker; the sucker operating member is configured to be operated by a user to drive the sucker to switch between a protruding state of protruding out of an outer surface of the bottom plate and a retracting state of being stored in the mounting port; when the sucker is in the protruding state, the sucker can be in vacuum suction connection to an external bearing surface; when the sucker is in the retracting state, the sucker can be separated from the external bearing surface; and the sucker operating member is rotationally connected to the mounting opening to drive the sucker to switch between the protruding state and the retracting state.

In an embodiment, the first case body further includes a partition; the partition divides the second storage space into a first portion and a second portion which are arranged up and down; the fitness tool storage case further includes at least one drawer assembly; the at least one drawer assembly is slidably arranged in the first portion above; and the at least one drawer assembly is configured to place at least one of a barbell bar, a massage ball, and a resistance band.

In an embodiment, the second case body further includes a supporting plate; the supporting plate is opposite to the second top plate and is connected to one side of the second connecting plate away from the second top plate; a bracket member is further arranged at one end of the second connecting plate away from the second top plate; the bracket member is movably connected to the second connecting plate, to cooperate with the supporting plate to support a mobile phone or tablet computer; the bracket member is slidably connected to the second connecting plate; the bracket member includes a sliding main body, a supporting portion connected to one end of the sliding main body, and a first supporting pad arranged on one side of the supporting portion close to the mobile phone or the tablet computer; the first supporting pad covers a side surface and top surface of the supporting portion, and the first supporting pad has a plurality of first supporting structures; the plurality of first supporting structures are parallel to each other; the bracket member is slidably connected to the second connecting plate in a first preset direction; the second connecting plate is provided with a sliding chute; one end of the bracket member is located in the sliding chute; one end of the sliding main body away from the supporting portion is located in the sliding chute; the second case body further includes a second supporting pad; the second supporting pad is arranged on a surface of the supporting plate close to the bracket member; the second supporting pad is provided with a plurality of second supporting structures; the plurality of second supporting structures are parallel to each other; the first supporting structures and the second supporting structures are parallel to each other; the first supporting structures include strip-shaped protrusions or strip-shaped grooves; the second supporting structures include strip-shaped protrusions or strip-shaped grooves; both the first supporting structures and the second supporting structures extend in a second preset direction; and the first preset direction is perpendicular to the second preset direction.

In an embodiment, a first buckle is arranged on the first case body, and a second buckle is arranged on the second case body; in the storage state, the first buckle and the second buckle are buckled and matched to connect and fix the first case body and the second case body; and the first buckle and the second buckle are further unbuckled under the driving of an unlocking member, so that the second case body can be separated from the first case body and turned over to the open state.

In an embodiment, the first top plate and the second top plate are connected by a high-damping rotating hinge.

In an embodiment, in the storage state, a storage groove is further provided in an outer surface of the top plate; the plurality of fitness tools include a push-up assembly; and the push-up assembly is arranged in the storage groove.

In an embodiment, the plurality of fitness tools further include a handle member configured to be connected to the push-up assembly; and the handle member is configured to be arranged in the second storage space.

In an embodiment, the plurality of fitness tools further include a leg clamp trainer; and the leg clamp trainer is configured to be arranged in the second storage space.

In an embodiment, the plurality of fitness tools further include a dumbbell kit; the dumbbell kit is configured to be arranged in the first storage space.

In an embodiment, the plurality of fitness tools further include a skipping rope assembly; and the skipping rope assembly is configured to be arranged in the second storage space.

In an embodiment, the second top plate is provided with a skipping rope fixing structure; and the skipping rope assembly is configured to be mounted on the skipping rope fixing structure.

In an embodiment, the skipping rope fixing structure includes a skipping rope grip fixing element and a ball fixing element; the skipping rope grip fixing element is configured to bear a skipping rope grip of the skipping rope assembly; the ball fixing element includes a plurality of annularly arranged fixed spring piece; each fixed spring piece includes an arc-shaped portion protruding outwards and an end portion; the arc-shaped portion is connected between the second top plate and the end portion; the plurality of fixed spring pieces are configured to fix a ball of the skipping rope assembly; the plurality of fitness tools further include a gripper; and the gripper is configured to be arranged in the second storage space.

In an embodiment, the gripper includes two grips movably connected to each other; the second connecting plate is provided with a grip fixing portion; and the grip fixing portion is configured to be clamped with at least one of the two grips.

Compared with the related art, according to the fitness tool storage case provided in the embodiments of the present disclosure, the plurality of fitness tools can be stored/placed. When the fitness tools are not used, an occupied space is reduced, and a user experience is enhanced.

BRIEF DESCRIPTION OF THE DRAWINGS

To describe the technical solutions in the embodiments of the present disclosure or in the related art more clearly, the following briefly introduces the accompanying drawings for describing the embodiments or the related art. Apparently, the accompanying drawings in the following description show merely the embodiments of the present disclosure, and a person of ordinary skill in the art may still derive other drawings from the provided accompanying drawings without creative efforts.

DETAILED DESCRIPTION OF THE EMBODIMENTS

Figure 1:
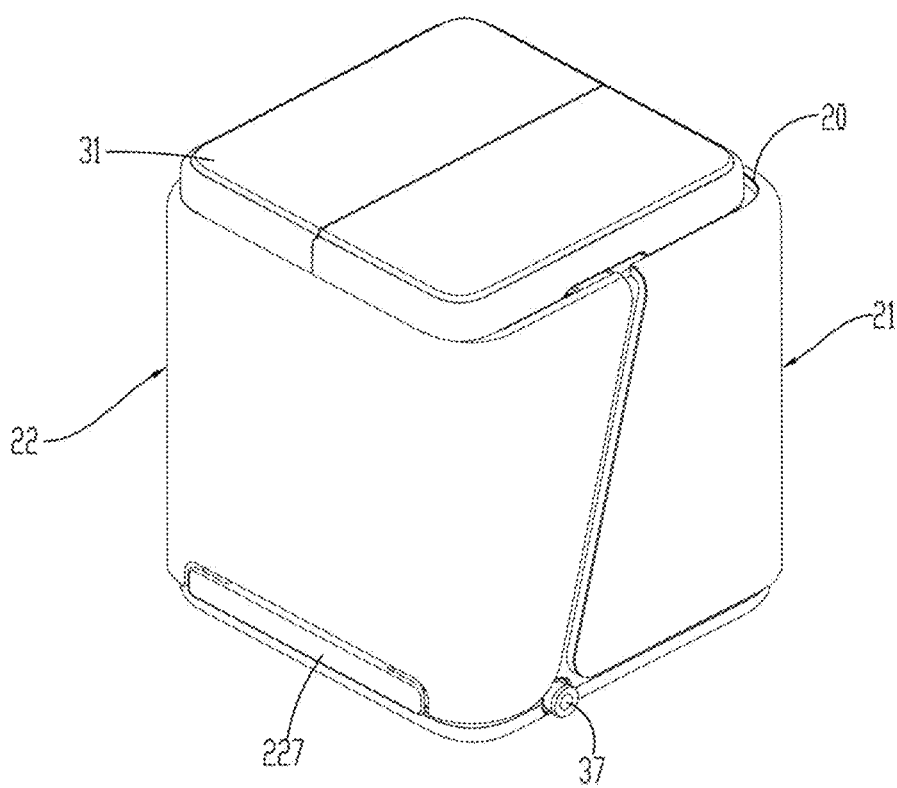
FIG. 1 is a three-dimensional diagram of a fitness tool storage case in a storage state, disclosed in an embodiment of the present disclosure.

In order to facilitate understanding the present disclosure, the present disclosure will be described more comprehensively below with reference to related accompanying drawings. Preferred implementations of the present disclosure are provided in the drawings. However, the present disclosure can be implemented in many different forms, and are not limited to the implementations described herein. On the contrary, these implementations are provided to make the content disclosed in the present disclosure understood more thoroughly and comprehensively.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Unless otherwise defined, all technical and scientific terms used herein have the same meaning as those commonly understood by a person skilled in the art to which the present disclosure belongs. Terms used in the specification of the present disclosure herein are merely intended to describe objectives of the specific embodiments, but are not intended to limit the present disclosure. The term "and/or" used herein includes any and all combinations of one or more related listed items.

Figure 2:
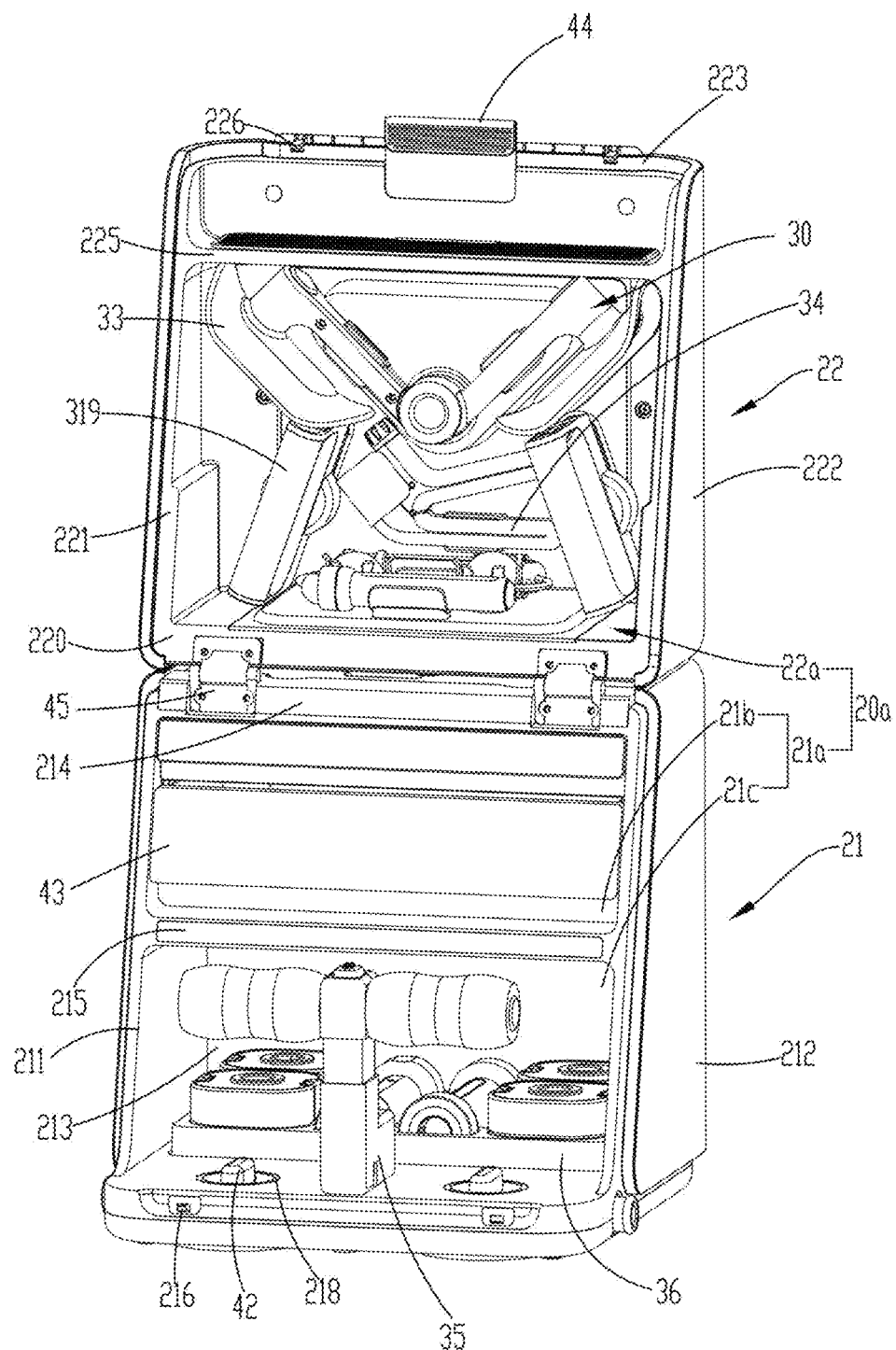
FIG. 2 is a three-dimensional diagram of the fitness tool storage case shown in FIG. 1, which is in an open state.
Figure 3:
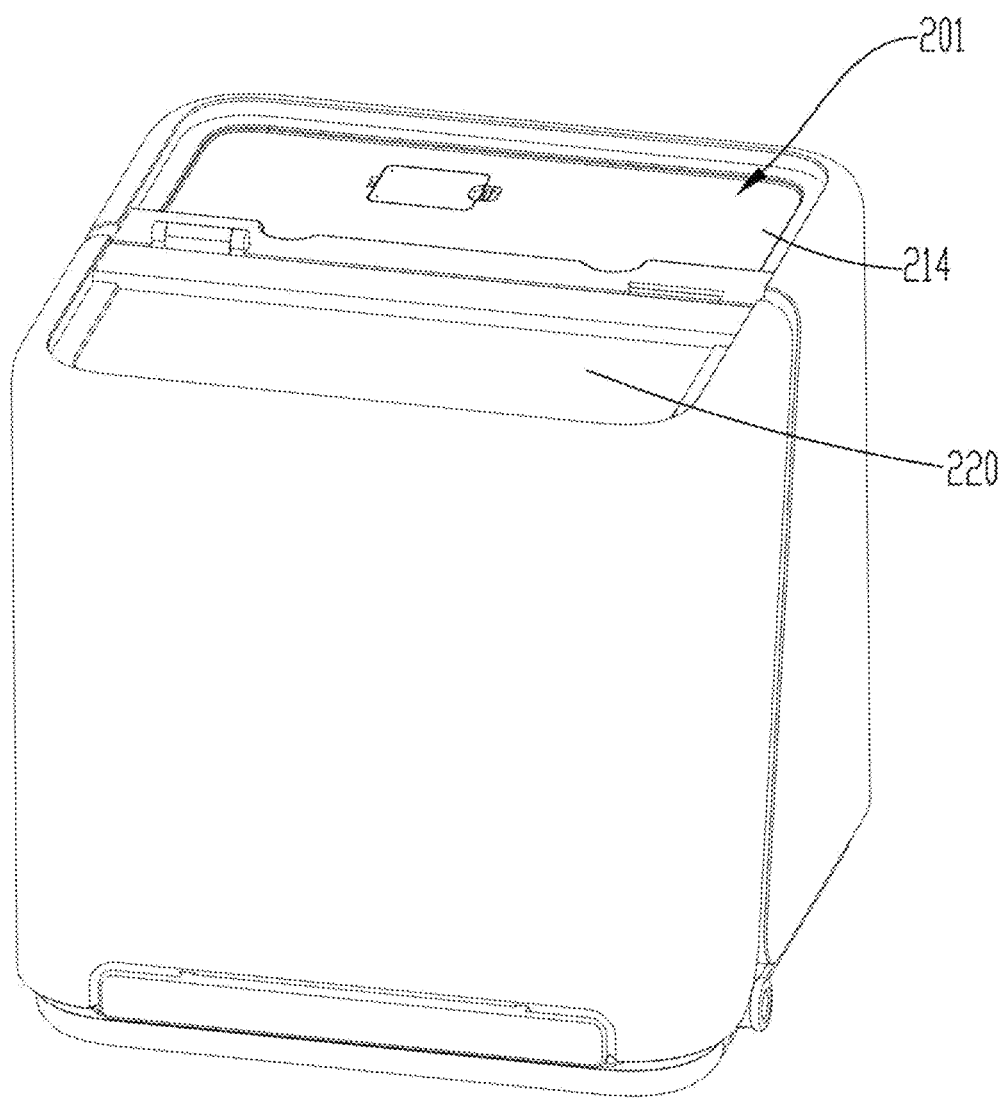
FIG. 3 is a three-dimensional diagram of the fitness tool storage case shown in FIG. 1, from which a push-up assembly is removed.
Figure 4:
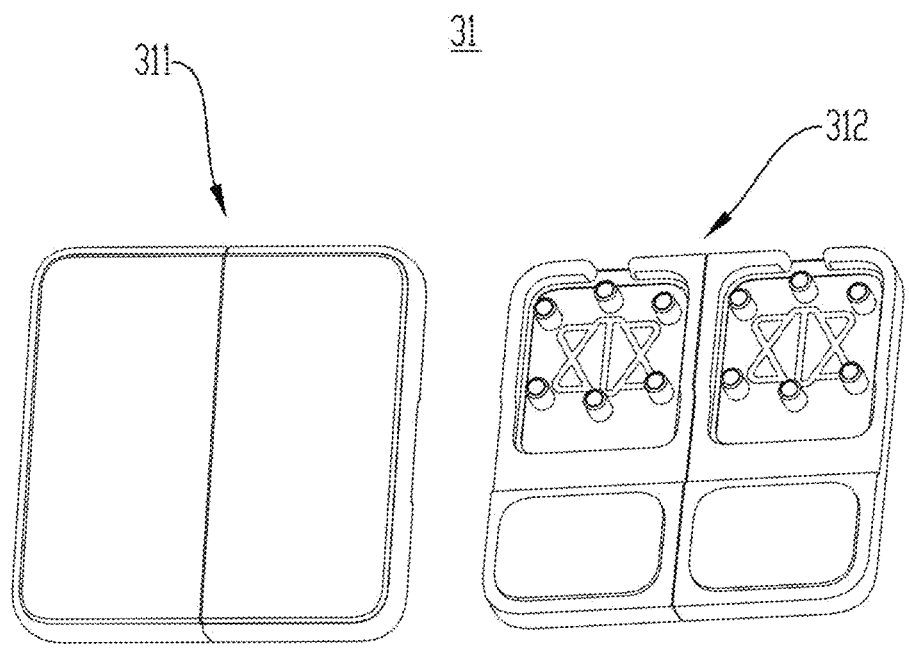
FIG. 4 is a three-dimensional exploded diagram of the push-up assembly of the fitness tool storage case shown in FIG. 3.
Figure 5:
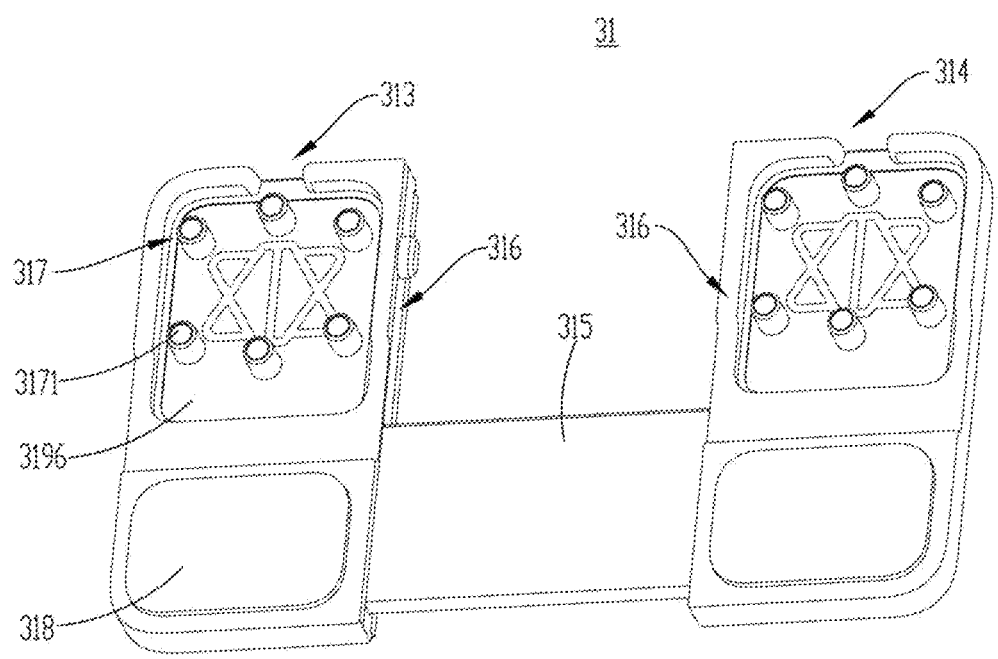
FIG. 5 is a schematic diagram of a changing state of a push-up board of the push-up assembly shown in FIG. 4.
Figure 6:
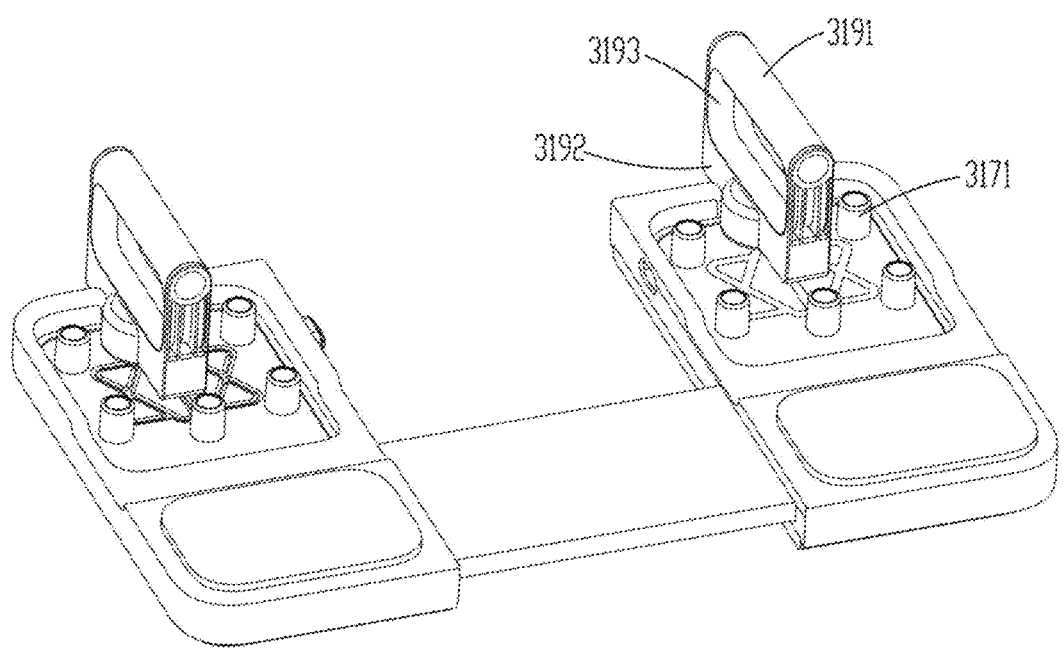
FIG. 6 is a schematic diagram of a state of mounting a handle member on the push-up board of the push-up assembly shown in FIG. 4.
Figure 7:
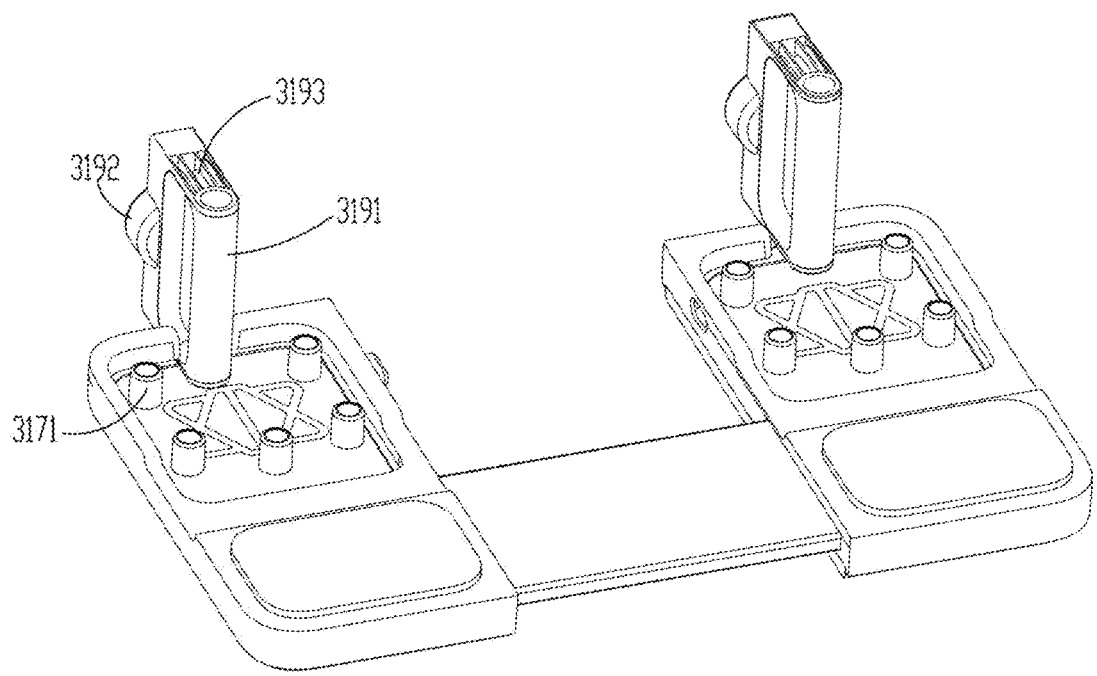
FIG. 7 is a schematic diagram of another state of mounting a handle member on the push-up board of the push-up assembly shown in FIG. 4.
Figure 8:
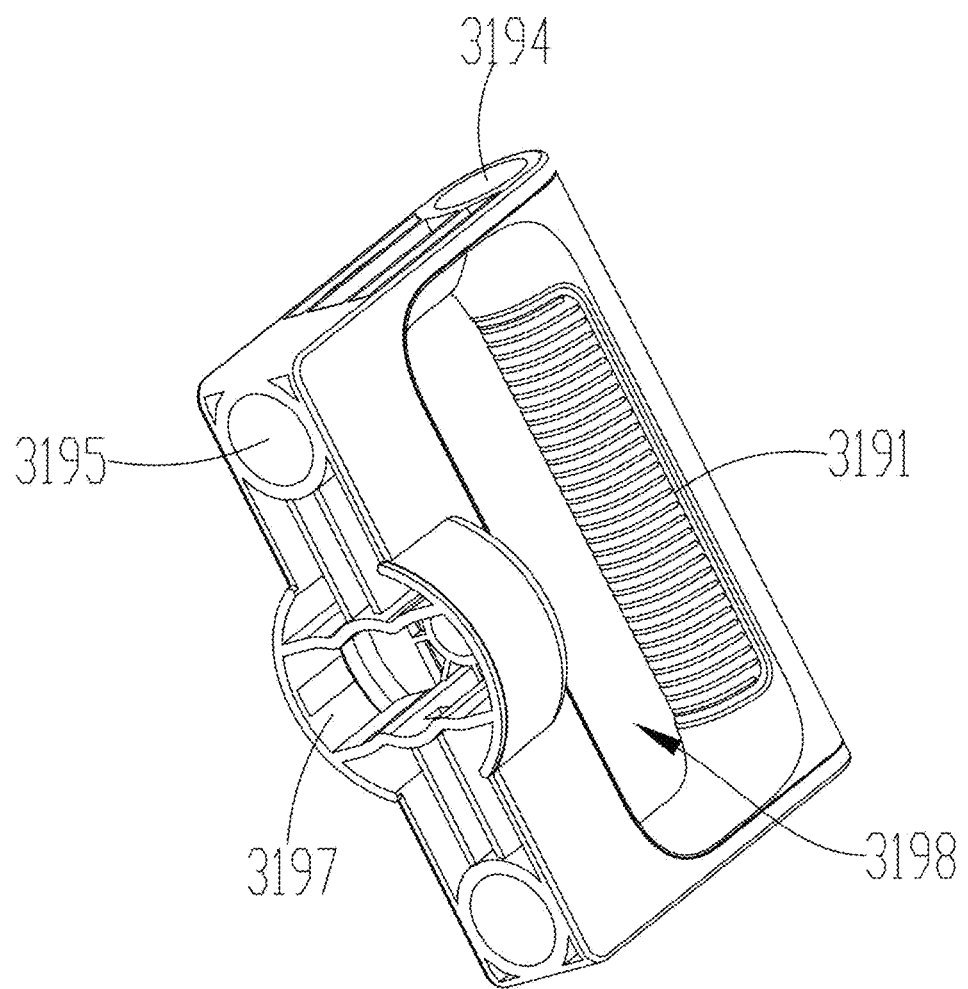
FIG. 8 is a three-dimensional diagram of the handle member of the push-up assembly shown in FIG. 4.
Figure 9:
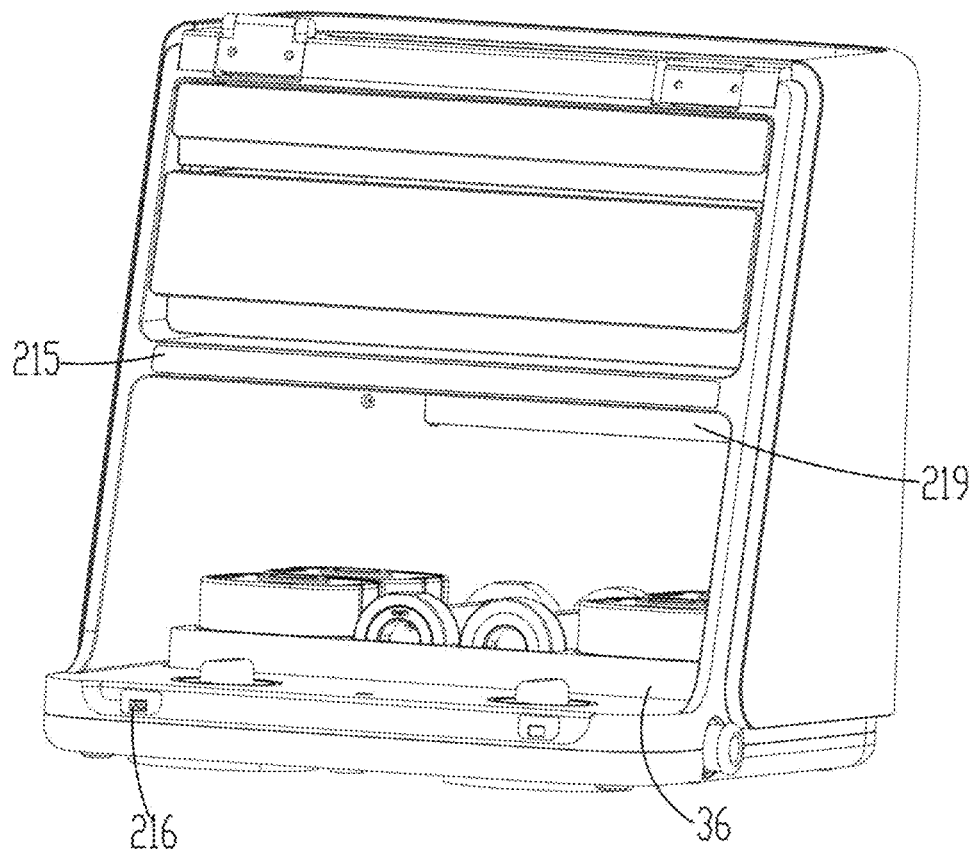
FIG. 9 is a schematic diagram of an internal structure of a second portion of a first case body of the fitness tool storage case shown in FIG. 2.
Figure 10:
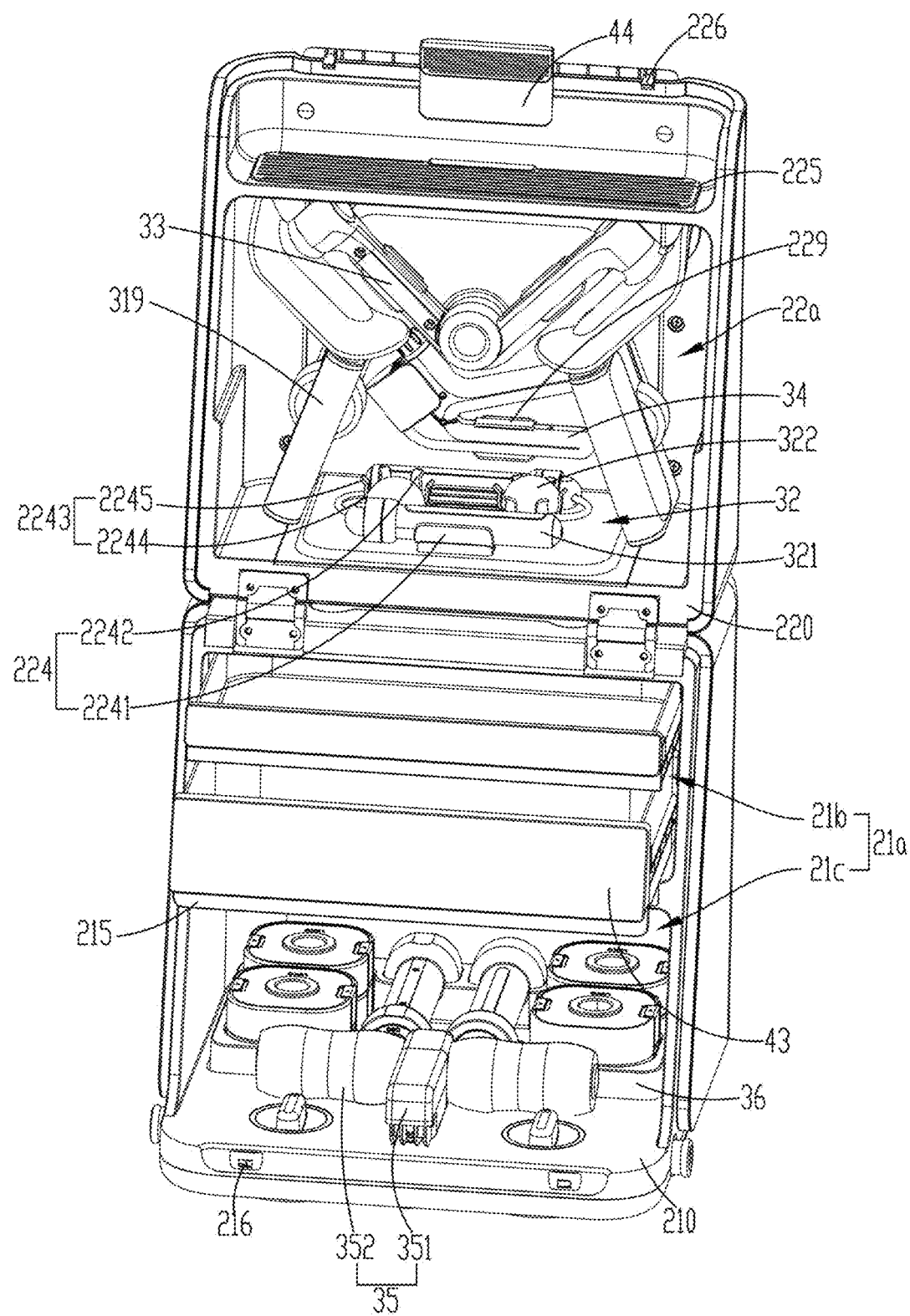
FIG. 10 is a schematic diagram of an internal structure of a second case body and a drawer assembly of the fitness tool storage case shown in FIG. 2.
Figure 11:
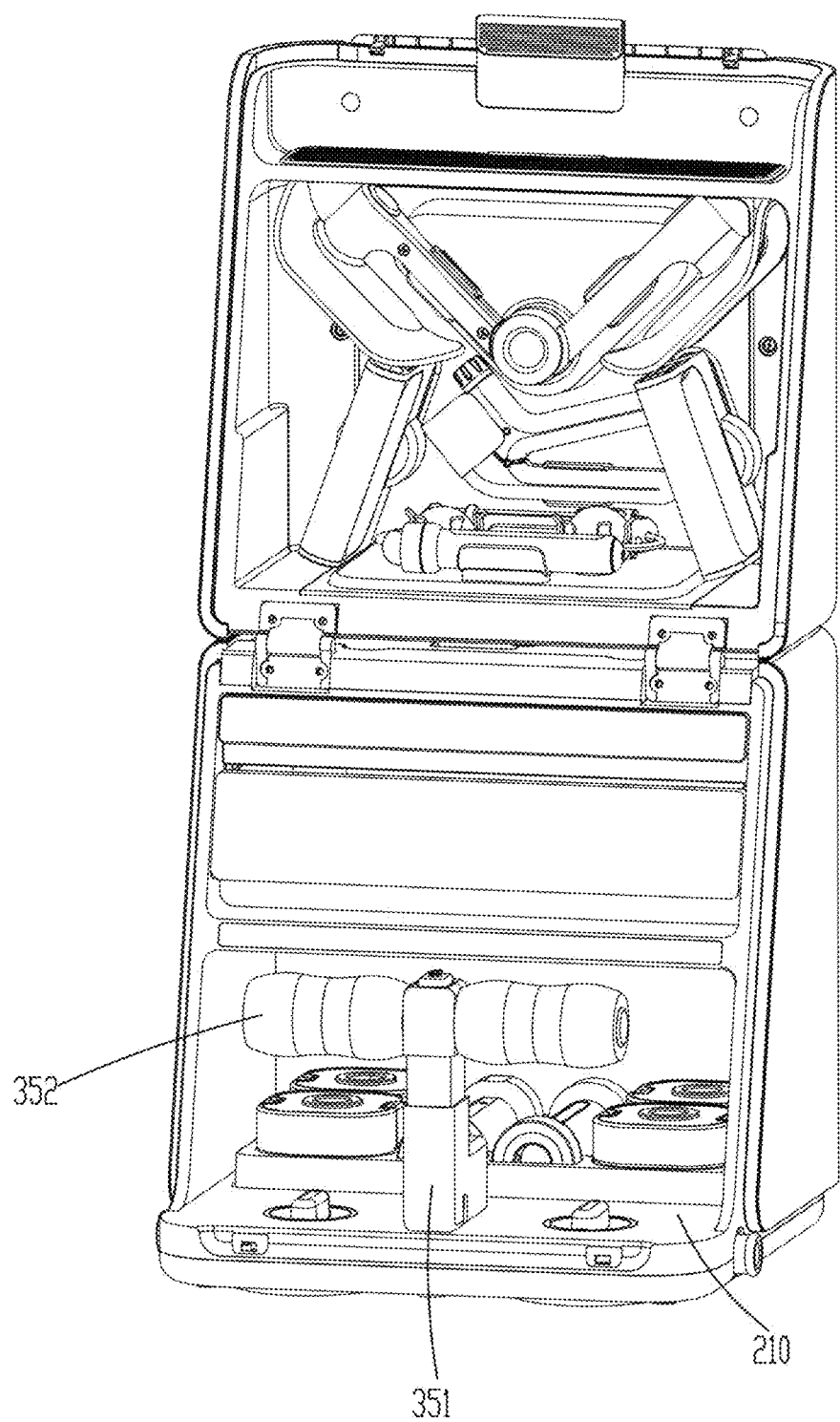
FIG. 11 is a schematic diagram of an internal structure when a sit-up device of the fitness tool storage case shown in FIG. 2 is in a using state.
Figure 12:
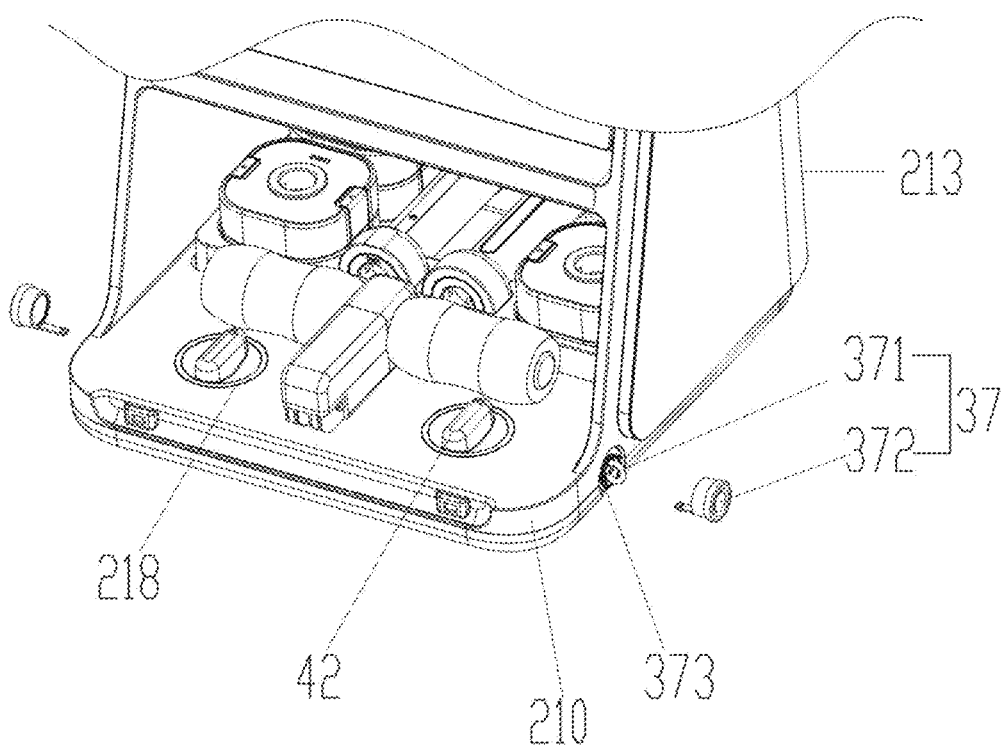
FIG. 12 is a schematic structural diagram of a resistance band fixing apparatus of the fitness tool storage case shown in FIG. 2.
Figure 13:
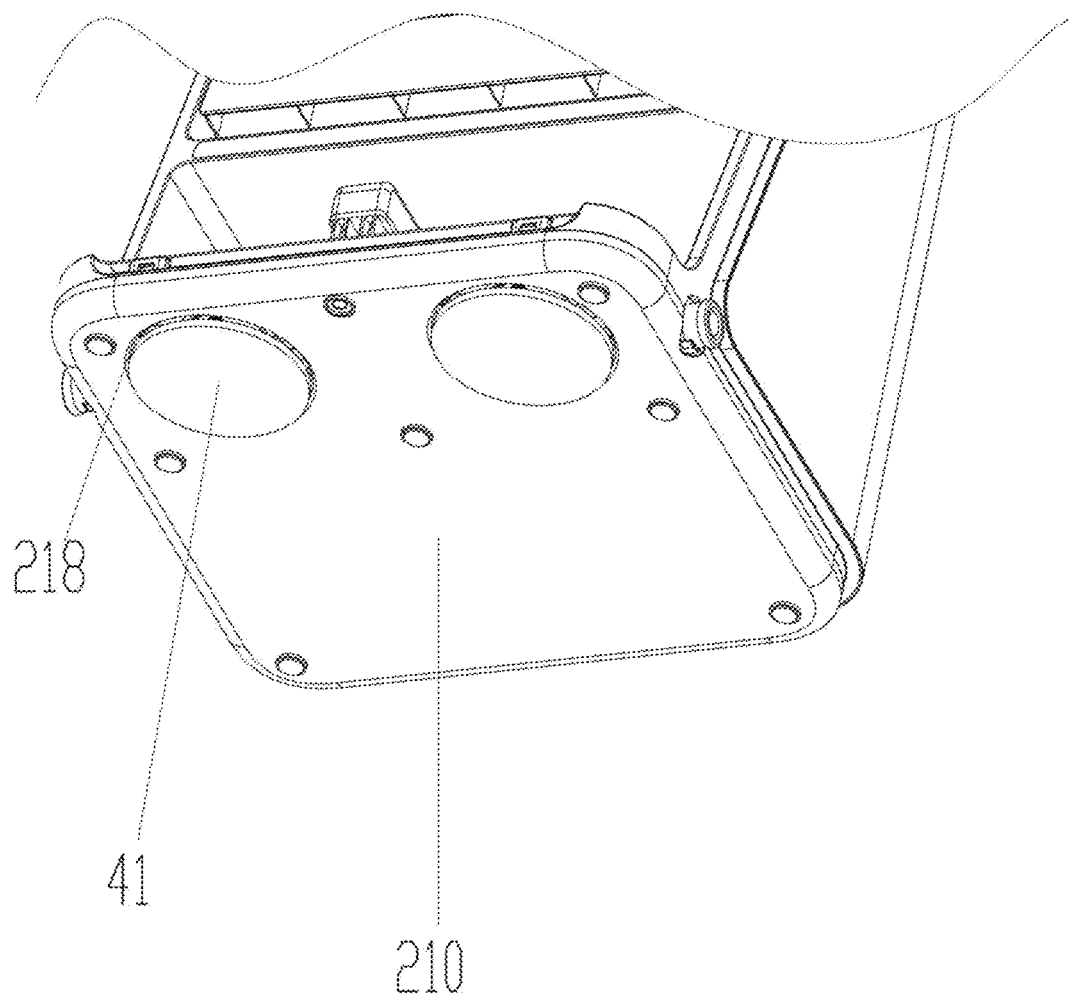
FIG. 13 is a schematic structural diagram of a sucker of the fitness tool storage case shown in FIG. 2.
Figure 14:
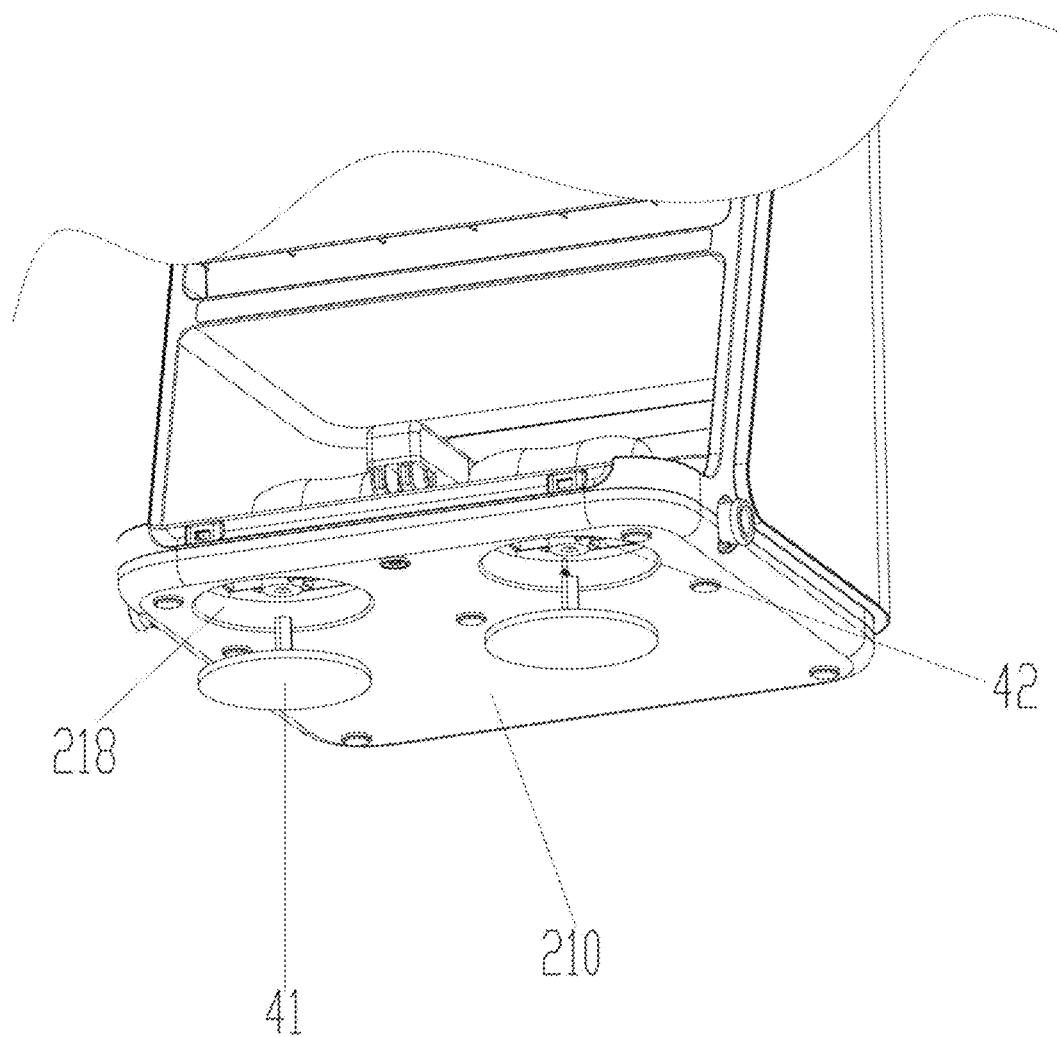
FIG. 14 is an exploded view of a sucker and a sucker operating member of the fitness tool storage case shown in FIG. 2.
Figure 15:
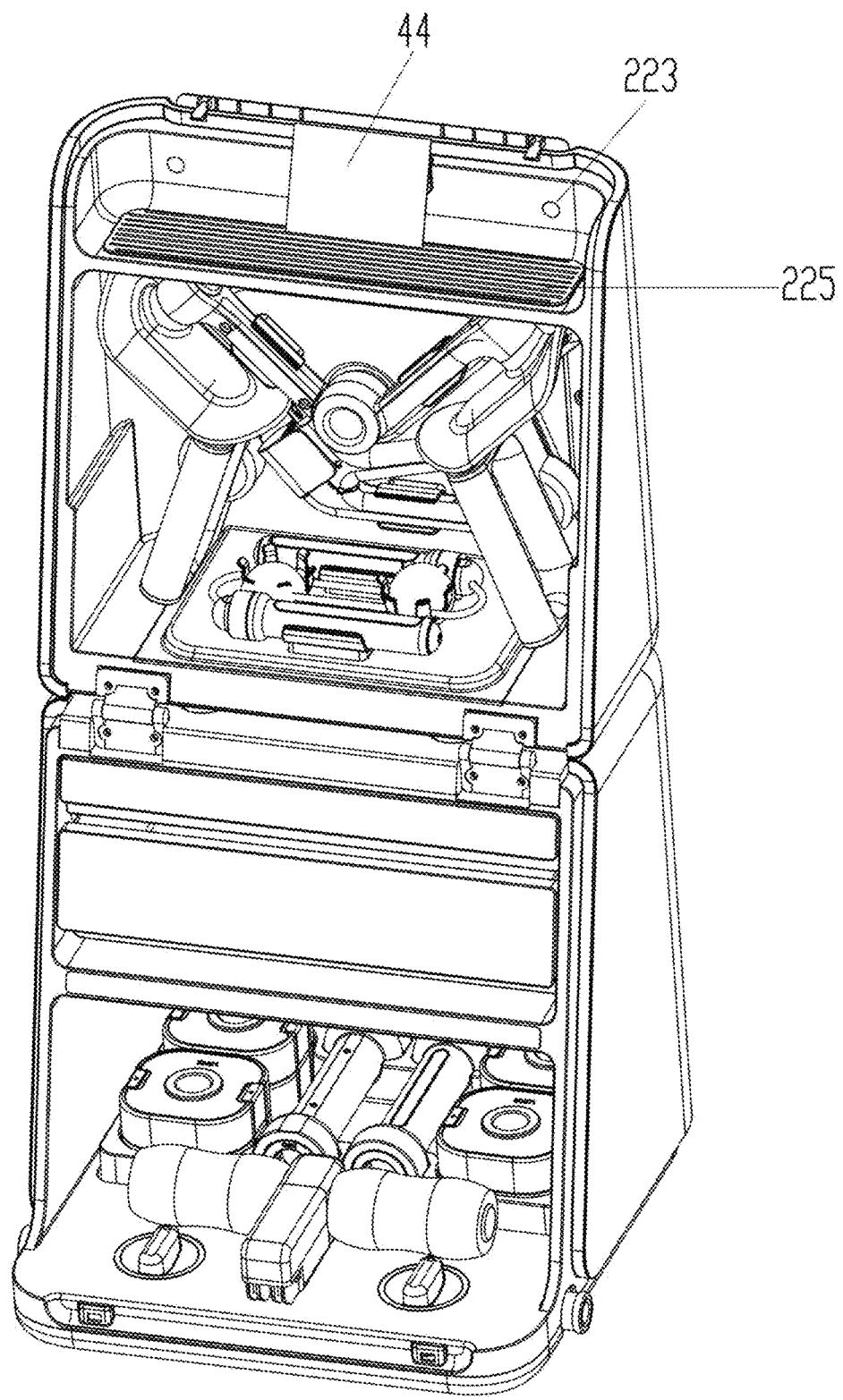
FIG. 15 is a schematic structural diagram of a bracket member of the fitness tool storage case shown in FIG. 2, which is in a storage state.
Figure 16:
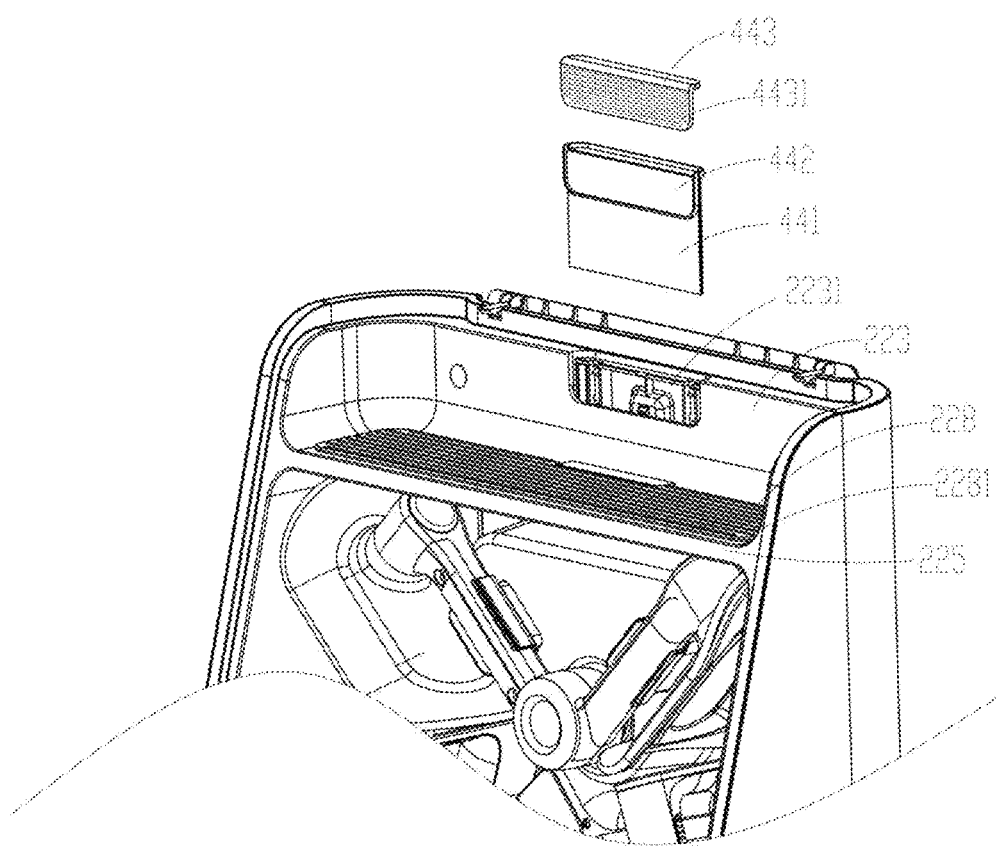
FIG. 16 is a schematic structural diagram of a bracket member of fitness tool storage case shown in FIG. 2, which is in an exploded state.
Figure 17:
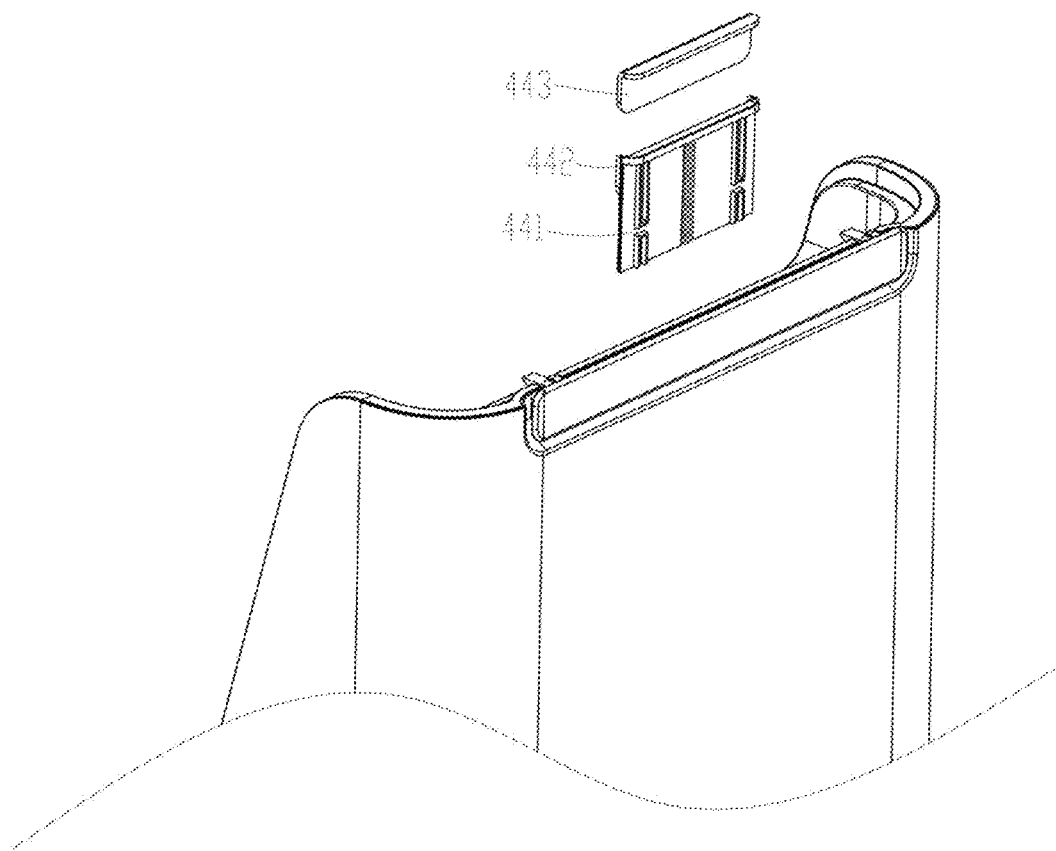
FIG. 17 is a schematic structural diagram of a bracket member of fitness tool storage case shown in FIG. 2, which is in an exploded state, viewed in another angle.
Figure 18:
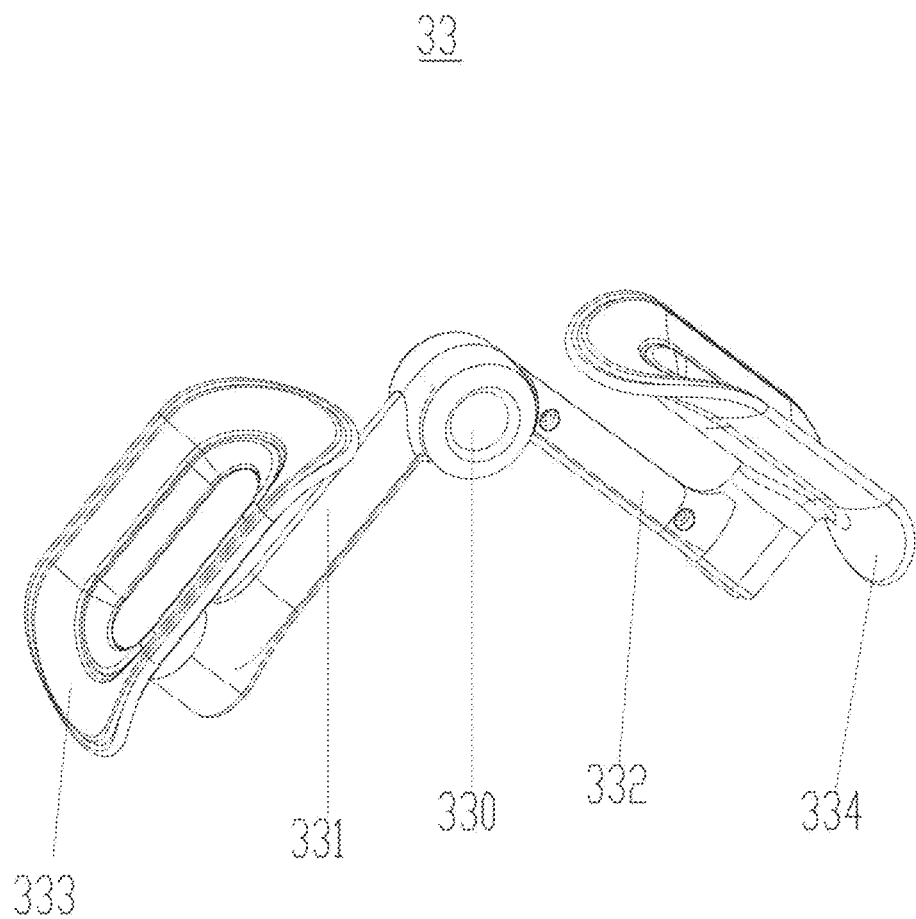
FIG. 18 is a schematic structural diagram of a leg clamp trainer, which can be stored, of the fitness tool storage case shown in FIG. 2.
Figure 19:
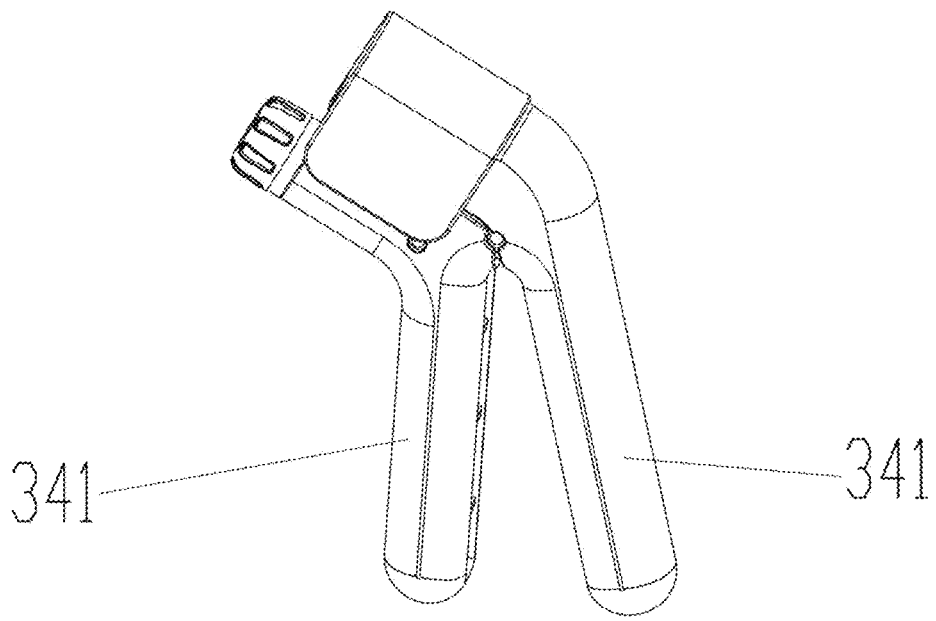
FIG. 19 is a schematic structural diagram of a gripe, which can be stored, of the fitness tool storage case shown in FIG. 2.
Figure 20:
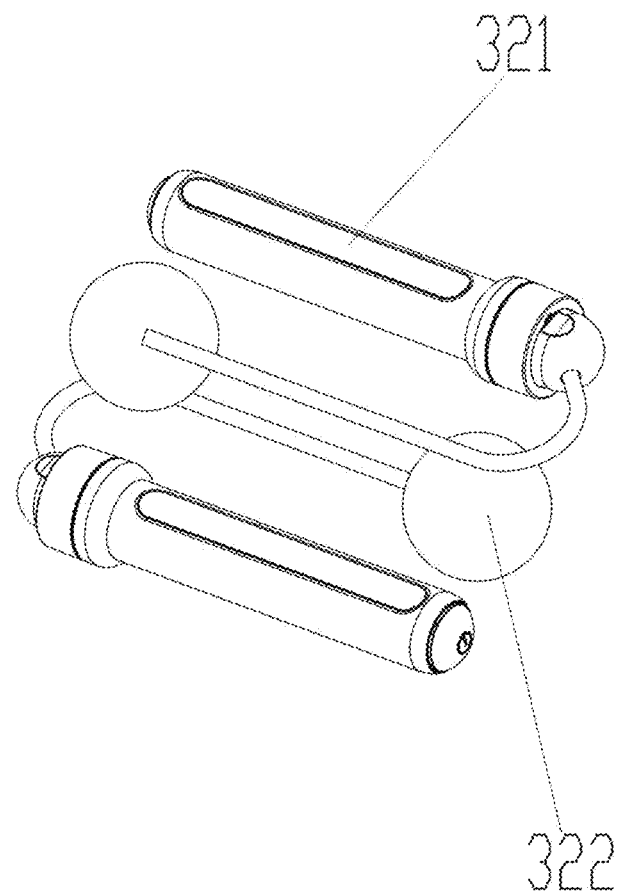
FIG. 20 is a schematic structural diagram of a skipping rope, which can be stored, of the fitness tool storage case shown in FIG. 2.
Figure 21:
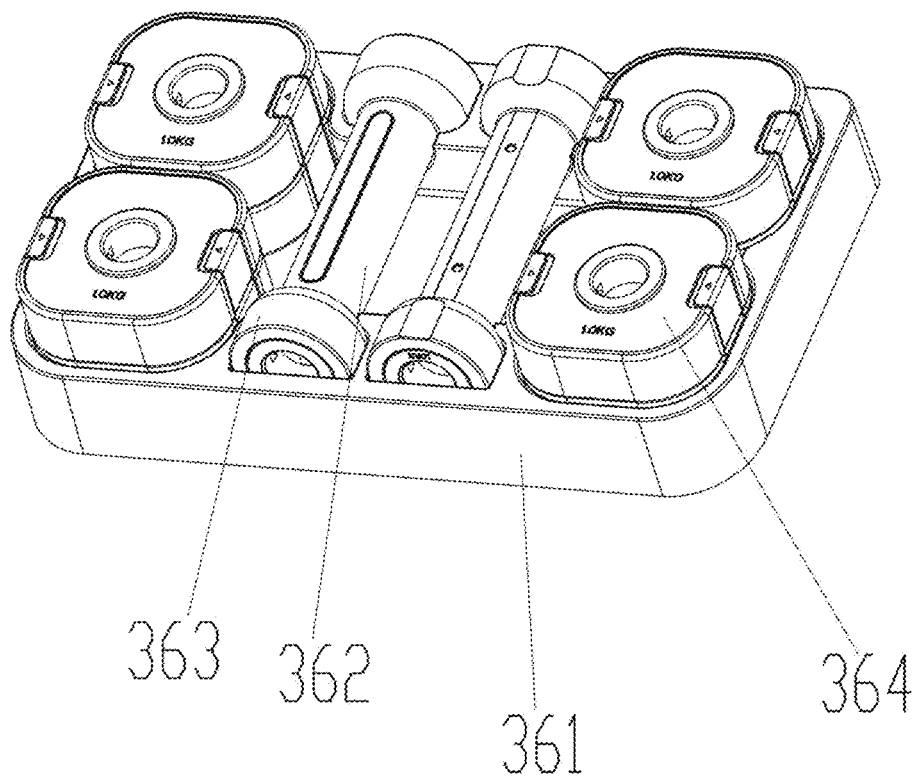
FIG. 21 is a schematic structural diagram of a dumbbell kit of the fitness tool storage case shown in FIG. 2.
Figure 22:
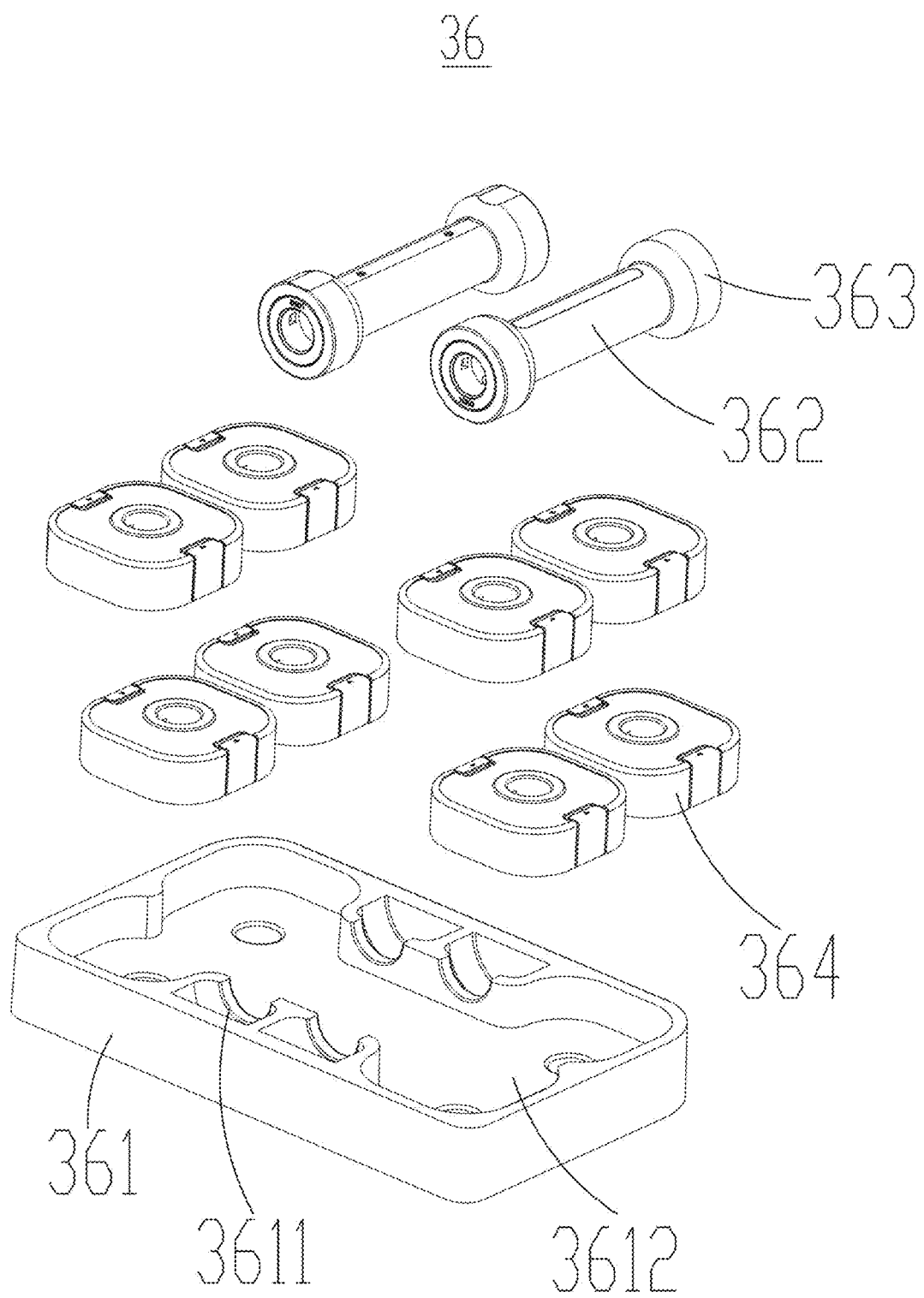
FIG. 22 is an exploded view of the dumbbell kit shown in FIG. 21.

Referring to FIG. 1 to FIG. 22, the embodiments of the present disclosure provide a fitness tool kit 10. The fitness tool kit 10 includes a fitness tool storage case 20 and a plurality of fitness tool. The fitness tool storage case 20 is configured to store/place the plurality of fitness tools 30.

Compared with the prior art, the fitness tool kit 10 provided in the embodiments of the present disclosure has the advantage that by the arrangement of the fitness tool storage case, the plurality of fitness tools 30 can be stored/placed. When the fitness tools are not used, an occupied space is reduced, and a user experience is enhanced.

In an embodiment, the fitness tool storage case 20 includes: a first case body 21, and a second case body 22 movably connected to the first case body 21. The first case body 21 and the second case body 22 can be in a storage state of being enclosed into a storage chamber 20a and an open state of being stacked; in the storage state, at least one of the plurality of fitness tools is arranged in the storage chamber 20a; and in the open state, at least one of the plurality of fitness tools 30 can be exposed for being fetched by a user. It can be understood that the first case body 21 is movably connected to the second case body 22, so that the fitness tool storage case 20 can have two using states, which is convenient for use by a user. Specifically, in the open state, the first case body 21 and the second case body 22 can be stacked, occupying a small space and having a height, making it more convenient for the user to fetch and place the plurality of fitness tools 30.

It can be understood that in the storage state, the fitness tool storage case 20 is of a roughly square case structure, which not only has a beautiful appearance, but also is convenient for placement and carrying.

In an embodiment, the first case body 21 and the second case body 22 are rotationally connected to each other; and the second case body 22 can be switched from the storage state of being spliced and enclosed with the first case body 21 to form the storage chamber to the open state of being turned over and stacked on one side of the first case body 21. It can be understood that the above flipping and stacking mode is not only convenient for operation by a user, but also has an effect of occupying a small space and facilitating a user to fetch and place the plurality of fitness tools 30.

In an embodiment, the first case body 21 includes a bottom plate 210, a first side plate 211 connected to the bottom plate 210, a second side plate 212 connected to the bottom plate 210 and opposite to the first side plate, a first connecting plate 213 connected to the bottom plate 210, the first side plate 211, and the second side plate 212, and a first top plate 214 connected to the first side plate 211, the second side plate 212, and the first connecting plate 213 and opposite to the bottom plate 210; and the first case body 21 has a first storage space 21a. The second case body 22 includes a second top plate 220, a third side plate 221 connected to the second top plate 220, a fourth side plate 222 connected to the second top plate 220 and opposite to the third side plate 221, and a second connecting plate 223 connected to the second top plate 220, the third side plate 221, and the fourth side plate 222; the second top plate 220 and the first top plate 214 are rotationally connected to each other; the second case body 22 has a second storage space 22a; in the storage state, the second top plate 220 and the first top plate 214 are spliced with each other to form a top plate opposite to the bottom plate 210; the first side plate 211 and the third side plate 221 are spliced with each other to form a first side plate structure; the second side plate 212 and the fourth side plate 222 are spliced with each other to form a second side plate structure; the first side plate structure and the second side plate structure are opposite to each other; the first connecting plate 213 and the second connecting plate 223 are opposite to each other; and the second connecting plate 223 is connected to the bottom plate 210. It can be understood that through the above settings, both the first case body 21 and the second case body 22 have the storage spaces, which can facilitate a user to fetch and place the plurality of fitness tools 30.

In an embodiment, a size of the first top plate 214 is consistent with a size of the second top plate 220; and in the open state, the second top plate 220 is turned over to a position above the first top plate 214 for being stacked and aligned with the first top plate 214. It can be understood that through the above settings, the second case body 22 can be stably arranged on the first case body 21, and the first case body 21 supports the second case body 22, which can avoid an unsafe state caused by the unstable gravity, so that the fitness tool kit 10 in the open state has high safety. However, it can be understood that in other embodiments, the sizes of the first top plate 214 and the second top plate 220 may not be consistent. By proper gravity configuration, a stable and safe technical effect can be obtained.

In an embodiment, in the storage state, a width of the first side plate 211 gradually decreases in a direction from the bottom plate 210 to the first top plate 214, a width of the third side plate 221 gradually increases in a direction from the bottom plate 210 to the second top plate 220, and a width of the first side plate structure remains unchanged in a direction from the bottom plate 210 to the top plate; and in the storage state, a width of the second side plate 212 gradually decreases in the direction from the bottom plate 210 to the first top plate 214, a width of the fourth side plate 222 gradually increases in the direction from the bottom plate 210 to the second top plate 220, and a width of the second side plate structure remains unchanged in the direction from the bottom plate 210 to the top plate. Through the above design, the fitness tool storage case 20 is of a roughly square case structure, which not only has a beautiful appearance, but also is convenient for placement and carrying.

In an embodiment, in the storage state, a storage groove 201 is further provided in an outer surface of the top plate; the plurality of fitness tools 30 include a push-up assembly 31; and the push-up assembly 31 is arranged in the storage groove 201. It can be understood that through the above settings, it can be convenient to fetch the push-up assembly 31.

In an embodiment, the push-up assembly 31 includes a storage box 311 and a push-up board 312; the push-up board 312 can be stored in the storage box 311; the push-up board 312 includes a first board body 313, a second board body 314, and a sliding connector 315 connected between the first board body 313 and the second board body 314; and the sliding connector 315 allows the first board body 313 and the second board body 314 to switch between a spliced state of being spliced and a separated state of being connected by the sliding connector 315. It can be understood that the push-up board 312 has the spliced state and the separated state, which is also convenient for a user to store the push-up board when the push-up board is not in use. A small space is occupied, and a user experience is high.

In an embodiment, each of the first board body 313 and the second board body 314 includes a sliding chute 316; the sliding chute 316 of the first board body 313 and the sliding chute 316 of the second board body 314 are opposite to each other; one end of the sliding connector 315 is slidably connected to the sliding chute 316 of the first board body 313; and the other end of the sliding connector 315 is slidably connected to the sliding chute 316 of the second board body 314. It can be understood that the above sliding structure has a simple design, low costs, convenience of mounting, and high reliability.

In an embodiment, each of the first board body 313 and the second board body 314 is provided with at least one first mounting portion 317; the at least one first mounting portion 317 is configured to mount a handle member 319; each of the first board body 313 and the second board body 314 is further provided with a supporting pad 318 arranged in a manner of being side-by-side with the at least one first mounting portion 317; the at least one first mounting portion 317 includes a plurality of mounting columns 3171; the handle member 319 includes a handle 3191, a mounting seat 3192 opposite to the handle 3191, and a connecting portion 3193 connected between the mounting seat 3192 and the handle 3191; first mounting slots 3194 are provided in two ends of the handle 3191; a second mounting slot 3195 is provided in one side of the mounting seat 3192 away from the handle 3191; the first mounting slots 3194 or the second mounting slots 3195 cooperate with at least one of the plurality of mounting columns 3171 to mount the handle member 319 on the first mounting portion 317; each of the first board body 313 and the second board body 314 is provided with a groove 3196; the at least one first mounting portion 317 is arranged on a bottom wall of the groove 3196; a reinforcing portion 3197 is further arranged at a middle position of the mounting seat 3192, so that a width of the middle position of the mounting seat 3192 is greater than a width of each of two end positions; the connecting portion 3193 includes two connecting portions 3193, and the two connecting portions 3193 are opposite to each other; and the handle 3191, the two connecting portions 3193, and the mounting seat 3192 are enclosed to form a holding space 3198 for allowing fingers to hold and pass through. It can be understood that the supporting pad 318 can protect the elbow of a user to an extent, thus enhancing the user experience. By the arrangement of the plurality of mounting columns 3171 and the plurality of first and second mounting slots 3194, 3195, the handle member can be mounted according to different needs, which has rich application scenarios and a high user experience.

In an embodiment, the plurality of fitness tools 30 further include a skipping rope assembly 32; the skipping rope assembly 32 is arranged in the second storage space 22a; the second top plate 220 is provided with a skipping rope fixing structure 224; the skipping rope assembly 32 is configured to be mounted on the skipping rope fixing structure 224; the skipping rope fixing structure 224 includes a skipping rope grip fixing element 2241 and a ball fixing element 2242; the skipping rope grip fixing element is configured to bear a skipping rope grip 321 of the skipping rope assembly 32; the ball fixing element 2242 includes a plurality of annularly arranged fixed spring piece 2243; each fixed spring piece 2243 includes an arc-shaped portion 2244 protruding outwards and an end portion 2245; the arc-shaped portion 2244 is connected between the second top plate 220 and the end portion 2245; and the plurality of fixed spring pieces 2243 are configured to fix a ball 322 of the skipping rope assembly 32. It can be understood that the above skipping rope fixing structure 224 can appropriately fix the skipping rope assembly 32, thus avoiding the problem that a skipping rope is tangled.

In an embodiment, the plurality of fitness tools 30 further include a leg clamp trainer 33; the leg clamp trainer 33 is configured to be arranged in the second storage space 22a; the at least one handle member 319 includes two handle members 319; the two handle members 319 are configured to be arranged in the second storage space 22a; the leg clamp trainer 33 is configured to be located above the two handle members 319; the leg clamp trainer 33 includes a rotation connecting structure 330; a first connecting arm 331 and a second connecting arm 332, connected to two sides of the rotation connecting structure 330, a first leg clamp plate 333 connected to one end of the first connecting arm 331 away from the rotation connecting structure 330; and a second leg clamp plate 334 connected to one end of the second connecting arm 332 away from the rotation connecting structure 330; and the first leg clamp plate 333 and the second leg clamp plate 334 are configured to be arranged above the two handle members 319 and are located at two corners of the second storage space 22a. Through the above settings, the layout configuration of the second storage space 22A can be appropriate and compact, which effectively saves the space and enhances the user experience.

In an embodiment, the plurality of fitness tools 30 further include a gripper 34; the gripper 34 is configured to be arranged in the second storage space 22a; the gripper 34 includes two grips 341 movably connected to each other; the second connecting plate 223 is provided with a grip fixing portion 229; and the grip fixing portion 229 is configured to be clamped with at least one of the two grips 341. By fixing the grip 34 with the grip fixing portion 229, the layout configuration of the second storage space 22a is also appropriate and compact, which effectively saves the space and enhances the user experience.

In an embodiment, the plurality of fitness tools 30 further include a sit-up device 35; the sit-up device 35 is configured to be arranged in the first storage space 21a; the sit-up device 35 include a supporting rod 351 and a crossbeam 352; the supporting rod 351 is movably connected to the bottom plate 210; the crossbeam 352 is connected to one end of the supporting rod 351 away from the bottom plate 210; the supporting rod 351 is rotationally connected to the bottom plate 210, so that the sit-up device 35 can be switched between a stacked state and a using state; a height of the sit-up device 35 in the stacked state is less than a height of the sit-up device 35 in the using state. It can be understood that the sit-up device 35 is arranged on the bottom plate 210, so that the layout is appropriate and highly reliable. In addition, the supporting rod 351 is movably connected to the bottom plate 210, so that the sit-up device 35 can be switched between the stacked state and the using state, and can be stacked for storage when not in use. The user experience is high.

In an embodiment, the plurality of fitness tools 30 further include a dumbbell kit 36; the dumbbell kit 36 is configured to be arranged in the first storage space 21a; the dumbbell kit 36 is arranged on the bottom plate 210; the dumbbell kit 36 includes a storage tray 361; and a plurality of grip parts 362, a plurality of first dumbbell heads 363 and a plurality of second dumbbell heads 364, arranged on the storage tray 361; the first dumbbell heads 363 are mounted at two ends of the grip parts 362; the plurality of first dumbbell heads 363 are arranged in a middle portion of the storage tray 361; the plurality of second dumbbell heads 364 are arranged at two ends of the storage tray 361 and are located on two sides of the plurality of first dumbbell heads 363; the storage tray 361 has a first storage portion 3611 for storing and fixing the first dumbbell heads 363, and a second storage portion 3612 for storing and fixing the second dumbbell heads 364; the fitness tool kit 10 further includes an atmosphere light 219 mounted on an inner side of the first case body 21; and the atmosphere light 219 can correspondingly irradiate the dumbbell kit 36. It can be understood that the dumbbell kit 36 is configured to be arranged in the first storage space 21a, so that the layout configuration of the first storage space 21a is appropriate and compact, which effectively saves the space and enhances the user experience. The layout of the storage tray 361 is also appropriate and compact, and the user experience is further enhanced. Through the ambient light 219, the dumbbell kit 36 on the inner side can be irradiated, making it convenient and safe to fetch the heavier dumbbell kits 36, and further enhancing the user experience.

In an embodiment, the fitness tool storage case 20 is further provided with at least one resistance band fixing apparatus 37; the at least one resistance band fixing apparatus 37 is configured to fix a resistance band; the resistance band fixing apparatus 37 includes a fixing ring 371 for fixing the resistance band, and a protective cap 372 covering the fixing ring 371; the fitness tool storage case 20 is provided with a mounting position 373; the fixing ring 371 is arranged at the mounting position 373; the protective cap 372 is detachably connected to the mounting position 373; the protective cap 372 is a flexible protective cap; a material of the protective cap 372 includes silica gel; and the mounting position 373 is located in an edge region of the bottom plate 210 away from the first connecting plate 213. The fitness tool storage case 20 is further provided with the at least one resistance band fixing apparatus 37, so that the fitness tool storage case is integrated with a resistance band fitness function, and the user experience is high. In addition, through the protective cap 372, the fixing ring 371 can be protected from being collided to be damaged, and the appearance is beautiful. In this embodiment, the resistance band fixing apparatus 37 includes at least two resistance band fixing apparatuses 37, and two of the resistance band fixing apparatuses 37 are arranged on two opposite sides of the bottom plate 210.

In an embodiment, the bottom plate 210 is provided with a mounting opening 218; the fitness tool kit 10 further includes a sucker 41 and a sucker operating member 42 connected to the sucker 41; the sucker 41 is mounted corresponding to the mounting opening 218 and is located on an outer side of the bottom plate 210; the sucker operating member 42 is mounted corresponding to the mounting opening 218 and is located on an inner side of the bottom plate 210; the sucker operating member 42 is connected to the sucker 41; the sucker operating member 42 is configured to be operated by a user to drive the sucker 41 to switch between a protruding state of protruding out of an outer surface of the bottom plate 210 and a retracting state of being stored in the mounting opening 218; when the sucker 41 is in the protruding state, the sucker 41 can be in vacuum suction connection to an external bearing surface; when the sucker 41 is in the retracting state, the sucker 41 can be separated from the external bearing surface; and the sucker operating member 42 is rotationally connected to the mounting opening 218 to drive the sucker 41 to switch between the protruding state and the retracting state. It can be understood that the storage case 20 can be fixed on the external bearing surface through the sucker 41 and the sucker operating member 42, thereby ensuring high safety during use of the fitness tool kit 10.

In an embodiment, the first case body 21 further includes a partition 215; the partition 215 divides the second storage space 22a into a first portion 21b and a second portion 21c which are arranged up and down; the fitness tool storage case further includes at least one drawer assembly 43; the at least one drawer assembly 43 is slidably arranged in the first portion 21*b* above; the at least one drawer assembly 43 is configured to place at least one of a barbell bar, a massage ball, and a resistance band. Through the partition 215, the layout of the second storage space 22*a* can be more appropriate, and the drawer assembly 43 can also facilitate storage, fetching, and placement of other fitness tool, thereby enhancing the user experience. It can be understood that this embodiment mainly takes two drawer assemblies 43 arranged up and down as an example for illustration.

In an embodiment, the second case body 22 further includes a supporting plate 225; the supporting plate 225 is opposite to the second top plate 220 and is connected to one side of the second connecting plate 223 away from the second top plate 220; a bracket member 44 is further arranged at one end of the second connecting plate 223 away from the second top plate 220; the bracket member 44 is movably connected to the second connecting plate 223, to cooperate with the supporting plate 225 to support a mobile phone or tablet computer; and the bracket member 44 can be slidably or rotationally connected to the second connecting plate 223. By the arrangement of the bracket member 44 and the supporting plate 225, the mobile phone or tablet computer can be placed on the supporting plate 225 and supported by both the bracket member 44 and the supporting plate 225. This allows a user to watch an electronic device such as the mobile phone or the tablet computer when using the fitness tool kit 10, such as doing exercise with a video played in the electronic device, thereby enhancing the exercise effect and the user experience.

Specifically, in this embodiment, the bracket member 44 is slidably connected to the second connecting plate 223, and at least a portion of the bracket member 44 can be slidably accommodated in the second connecting plate 223. The bracket member 44 includes a sliding main body 441, a supporting portion 442 connected to one end of the sliding main body 441, and a first supporting pad 443 arranged on one side of the supporting portion 442 close to the mobile phone or the tablet computer; the first supporting pad 443 covers a side surface and top surface of the supporting portion 442, and the first supporting pad 443 has a plurality of first supporting structures 4431; the plurality of first supporting structures 4431 are parallel to each other; the bracket member 44 is slidably connected to the second connecting plate 223 in a first preset direction (e.g. a vertical direction); the second connecting plate 223 is provided with a sliding chute 2231; one end of the bracket member 44 can be slidably accommodated in the sliding chute 2231; one end of the sliding main body 441 away from the supporting portion 442 is located in the sliding chute 2231; the second case body 22 further includes a second supporting pad 228; the second supporting pad 228 is arranged on a surface of the supporting plate 225 close to the bracket member 44; the second supporting pad 228 is provided with a plurality of second supporting structures 2281; the plurality of second supporting structures 2281 are parallel to each other; the first supporting structures 4431 and the second supporting structures 2281 are parallel to each other; the first supporting structures 4431 include strip-shaped protrusions or strip-shaped grooves; the second supporting structures 2281 include strip-shaped protrusions or strip-shaped grooves; both the first supporting structures 4431 and the second supporting structures 2281 extend in a second preset direction; and the first preset direction is perpendicular to the second preset direction.

It can be understood that the bracket member 44 is slidably connected to the second connecting plate 223, so that the bracket member 44 can be stored in the second connecting plate 223 when not in use. The bracket member 44 is then pulled out when in use, which is convenient for storage and use and achieves a high user experience. By the first supporting structures 4431 of the first supporting pad 443 and the second supporting structures 2281 of the second supporting pad 228, an anti-skid effect or an angle adjustment effect can be achieved, thereby achieving the purpose of stably supporting an electronic device. In addition, the first preset direction is a vertical direction, which also facilitates a user to adjust an extension height of the bracket member 44 according to a size of the electronic device, thereby achieving a high user experience.

In an embodiment, a first buckle 216 is arranged on the first case body 21, and a second buckle 226 is arranged on the second case body 22; in the storage state, the first buckle 216 and the second buckle 226 are buckled and matched to connect and fix the first case body 21 and the second case body 22; and the first buckle 216 and the second buckle 226 can be further unbuckled under the driving of an unlocking member 227, so that the second case body 22 can be separated from the first case body 21 and turned over to the open state. It can be understood that the first buckle 216 and the second buckle 226 can make the fitness tool kit 10 more stable in the storage state, and it is also convenient for a user to operate the unlocking member 227. It can be understood that the first buckle 216 and the second buckle 226 can be respectively a hook and a hook slot.

In an embodiment, the first top plate 214 and the second top plate 220 are connected by a high-damping rotating hinge 45. It can be understood that the high-damping rotating hinge 45 can improve the reliability of the rotational connection, prolong the service life of the fitness tool kit 10, and improves the safety of the fitness tool kit 10.

The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification. The foregoing embodiments merely express several implementations of the present disclosure. The descriptions thereof are relatively specific and detailed, but are not understood as limitations on the scope of the utility model patent A person of ordinary skill in the art can also make several transformations and improvements without departing from the idea of the present application. These transformations and improvements fall within the protection scope of the present application. Therefore, the protection scope of the patent of present disclosure shall be subject to the appended claims.

What is claimed is:

1. A fitness tool storage case, configured to store/place a plurality of fitness tools, wherein the fitness tool storage case comprises:
   a first case body; and
   a second case body movably connected to the first case body, wherein the first case body and the second case body are in a storage state of being enclosed into a storage chamber and an open state of being stacked;
   in the storage state, at least one of the plurality of fitness tools is arranged in the storage chamber; and
   in the open state, at least one of the plurality of fitness tools is exposed for being fetched by a user;

the first case body and the second case body are rotationally connected to each other; and the second case body is switched from the storage state of being connected and enclosed with the first case body to form the storage chamber to the open state of being turned over and stacked on one side of the first case body;

the first case body comprises a bottom plate, a first side plate connected to the bottom plate, a second side plate connected to the bottom plate and opposite to the first side plate, a first connecting plate connected to the bottom plate, the first side plate, and the second side plate, and a first top plate connected to the first side plate, the second side plate, and the first connecting plate and opposite to the bottom plate; the first case body has a first storage space;

the second case body comprises a second top plate, a third side plate connected to the second top plate, a fourth side plate connected to the second top plate and opposite to the third side plate, and a second connecting plate connected to the second top plate, the third side plate, and the fourth side plate; the second top plate and the first top plate are rotationally connected to each other; the second case body has a second storage space;

in the storage state, the second top plate and the first top plate are connected with each other to form a top plate opposite to the bottom plate; the first side plate and the third side plate are connected with each other to form a first side plate structure; the second side plate and the fourth side plate are connected with each other to form a second side plate structure; the first side plate structure and the second side plate structure are opposite to each other; the first connecting plate and the second connecting plate are opposite to each other; and the second connecting plate is connected to the bottom plate;

the fitness tool storage case is further provided with at least one resistance band fixing apparatus; the at least one resistance band fixing apparatus is configured to fix a resistance band;

the resistance band fixing apparatus comprises a fixing ring for fixing the resistance band, and a protective cap covering the fixing ring;

the fitness tool storage case is provided with a mounting position; the fixing ring is arranged at the mounting position; the protective cap is detachably connected to the mounting position;

the protective cap is a flexible protective cap; a material of the protective cap comprises silica gel; and the mounting position is located in an edge region of the bottom plate away from the first connecting plate.

2. The fitness tool storage case according to claim 1, wherein
a size of the first top plate is consistent with a size of the second top plate; and in the open state, the second top plate is turned over to a position above the first top plate for being stacked and aligned with the first top plate.

3. The fitness tool storage case according to claim 1, wherein
in the storage state, a width of the first side plate gradually decreases in a direction from the bottom plate to the first top plate, a width of the third side plate gradually increases in a direction from the bottom plate to the second top plate, and a width of the first side plate structure remains unchanged in a direction from the bottom plate to the top plate; and in the storage state, a width of the second side plate gradually decreases in the direction from the bottom plate to the first top plate, a width of the fourth side plate gradually increases in the direction from the bottom plate to the second top plate, and a width of the second side plate structure remains unchanged in the direction from the bottom plate to the top plate.

4. The fitness tool storage case according to claim 1, wherein the bottom plate is provided with a mounting opening; the fitness tool storage case further comprises a sucker and a sucker operating member connected to the sucker; the sucker is mounted corresponding to the mounting opening and is located on an outer side of the bottom plate; the sucker operating member is mounted corresponding to the mounting opening and is located on an inner side of the bottom plate; the sucker operating member is connected to the sucker; the sucker operating member is configured to be operated by a user to drive the sucker to switch between a protruding state of protruding out of an outer surface of the bottom plate and a retracting state of being stored in the mounting port; when the sucker is in the protruding state, the sucker is in vacuum suction connection to an external bearing surface; when the sucker is in the retracting state, the sucker is separated from the external bearing surface; and the sucker operating member is rotationally connected to the mounting opening to drive the sucker to switch between the protruding state and the retracting state.

5. The fitness tool storage case according to claim 1, wherein the first case body further comprises a partition; the partition divides the second storage space into a first portion and a second portion, arranged up and down; the fitness tool storage case further comprises at least one drawer assembly; the at least one drawer assembly is slidably arranged in the first portion above; the at least one drawer assembly is configured to place at least one of a barbell bar, a massage ball, and a resistance band.

6. The fitness tool storage case according to claim 1, wherein
the second case body further comprises a supporting plate; the supporting plate is opposite to the second top plate and is connected to one side of the second connecting plate away from the second top plate; a bracket member is further arranged at one end of the second connecting plate away from the second top plate; the bracket member is movably connected to the second connecting plate, to cooperate with the supporting plate to support a mobile phone or tablet computer; the bracket member is slidably connected to the second connecting plate; the bracket member comprises a sliding main body, a supporting portion connected to one end of the sliding main body, and a first supporting pad arranged on one side of the supporting portion close to the mobile phone or the tablet computer; the first supporting pad covers a side surface and top surface of the supporting portion, and the first supporting pad has a plurality of first supporting structures; the plurality of first supporting structures are parallel to each other; the bracket member is slidably connected to the second connecting plate in a first preset direction; the second connecting plate is provided with a sliding chute; one end of the bracket member is located in the sliding chute; one end of the sliding main body away from the supporting portion is located in the sliding chute; the second case body further comprises a second supporting pad; the second supporting pad is arranged on a surface of the supporting plate close to the bracket member; the second supporting pad is provided with a plurality of second supporting structures; the plurality of second supporting structures are parallel to each other; the first supporting structures and the second supporting structures are parallel to each other; the first supporting structures comprise strip-shaped protrusions or strip-shaped grooves; the second supporting structures comprise strip-shaped protrusions or strip-shaped grooves; both the first supporting structures and the second supporting structures extend in a second preset direction; and the first preset direction is perpendicular to the second preset direction.

7. The fitness tool storage case according to claim 1, wherein a first buckle is arranged on the first case body, and a second buckle is arranged on the second case body; in the storage state, the first buckle and the second buckle are buckled and matched to connect and fix the first case body and the second case body; the first buckle and the second buckle are further unbuckled under the driving of an unlocking member, so that the second case body is separated from the first case body and turned over to the open state; and the first top plate and the second top plate are connected by a high-damping rotating hinge.

8. The fitness tool storage case according to claim 1, wherein in the storage state, a storage groove is further provided in an outer surface of the top plate; the plurality of fitness tools comprise a push-up assembly; the push-up assembly is arranged in the storage groove;

the plurality of fitness tools further comprise a handle member configured to be connected to the push-up assembly; the handle member is configured to be arranged in the second storage space;

the plurality of fitness tools further comprise a leg clamp trainer; the leg clamp trainer is configured to be arranged in the second storage space;

the plurality of fitness tools further comprise a dumbbell kit; the dumbbell kit is configured to be arranged in the first storage space;

the plurality of fitness tools further comprise a skipping rope assembly; the skipping rope assembly is configured to be arranged in the second storage space;

the second top plate is provided with a skipping rope fixing structure; the skipping rope assembly is configured to be mounted on the skipping rope fixing structure;

the skipping rope fixing structure comprises a skipping rope grip fixing element and a ball fixing element; the skipping rope grip fixing element is configured to bear a skipping rope grip of the skipping rope assembly; the ball fixing element comprises a plurality of annularly arranged fixed spring piece; each fixed spring piece comprises an arc-shaped portion protruding outwards and an end portion; the arc-shaped portion is connected between the second top plate and the end portion; the plurality of fixed spring pieces are configured to fix a ball of the skipping rope assembly; the plurality of fitness tool further comprise a gripper; the gripper is configured to be arranged in the second storage space;

the gripper comprises two grips movably connected to each other; the second connecting plate is provided with a grip fixing portion; and the grip fixing portion is configured to be clamped with at least one of the two grips.

* * * * *